United States Patent [19]

Callahan et al.

[11] Patent Number: 5,183,147
[45] Date of Patent: Feb. 2, 1993

[54] CHEMICAL HANDLING SYSTEM

[75] Inventors: David D. Callahan, Rochester; Craig Reese, Roanoke; Douglas P. Baxter, Rochester; Stephen M. Murray, Fort Wayne, all of Ind.

[73] Assignee: Murray Equipment, Inc., Fort Wayne, Ind.

[21] Appl. No.: 790,371

[22] Filed: Nov. 12, 1991

Related U.S. Application Data

[63] Continuation-in-part of Ser. No. 654,785, Feb. 11, 1991, abandoned.

[51] Int. Cl.⁵ .............................................. B65G 33/26
[52] U.S. Cl. .................................. 198/524; 198/526; 198/674; 198/550.1; 198/532; 198/661; 198/666
[58] Field of Search ............... 414/326, 345, 343, 526, 414/289; 198/659, 524, 674, 671, 666, 534, 525, 661, 532

[56] References Cited

U.S. PATENT DOCUMENTS

| | | | |
|---|---|---|---|
| 881,446 | 3/1908 | Schwartz | 198/352 |
| 1,828,984 | 10/1931 | Schweickart | 198/674 X |
| 2,343,707 | 3/1944 | Roland | 198/661 X |
| 2,438,637 | 4/1948 | Jansen . | |
| 2,533,796 | 12/1950 | Harris et al. | 198/661 X |
| 2,601,049 | 6/1952 | Neighbour | 414/326 |
| 2,839,208 | 6/1958 | Hansen | 414/526 X |
| 2,877,914 | 3/1959 | Herr | 414/526 X |
| 2,883,076 | 4/1959 | Palmer | 414/526 X |
| 2,888,128 | 5/1959 | Allen . | |
| 3,053,227 | 9/1962 | Mitchell . | |
| 3,081,862 | 3/1963 | Knoedler | 198/674 |
| 3,085,674 | 4/1963 | Gooding | 198/671 X |
| 3,125,211 | 3/1964 | Macy | 198/674 |
| 3,171,558 | 3/1965 | Sharp | 414/526 X |
| 3,179,272 | 4/1965 | Goldberger | 414/526 X |
| 3,194,385 | 7/1965 | Barnese | 198/674 X |
| 3,220,539 | 11/1965 | Anagnos . | |
| 3,381,801 | 5/1968 | Rastoin . | |
| 3,684,082 | 8/1972 | Wardell . | |
| 3,707,224 | 12/1972 | Rastoin . | |
| 3,722,666 | 3/1973 | Ulm et al. | |
| 3,726,392 | 4/1973 | Rastoin . | |
| 3,727,746 | 4/1973 | Slusher . | |
| 3,802,551 | 4/1974 | Somers . | |
| 3,891,109 | 6/1975 | Olson | 414/526 X |
| 4,016,970 | 4/1977 | Wert | 198/550.1 |
| 4,036,411 | 7/1977 | Westhoff | 198/661 X |
| 4,057,225 | 11/1977 | Ferree . | |
| 4,077,527 | 3/1978 | Fryer et al. . | |
| 4,613,275 | 9/1986 | Karlowsky | 414/326 X |
| 4,923,358 | 5/1990 | Van Mill | 198/550.1 X |
| 4,963,066 | 10/1990 | Boppart | 198/671 X |
| 4,989,716 | 2/1991 | Stuckey | 198/550.1 X |
| 5,033,608 | 7/1991 | Lorimor et al. | 198/674 |

Primary Examiner—D. Glenn Dayoan
Attorney, Agent, or Firm—Baker & Daniels

[57] ABSTRACT

A system for handling agricultural chemicals, such as herbicides, pesticides, and the like which are supplied in dry form. A refillable tank includes an integral, internal auger that horizontally extends through the bottom portion of the tank and is adapted to feed dry chemicals from an outlet in one side of the integer auger, and an internal flow regulating system for apportioning the chemical into the auger. The internal tank auger is driven by a detachable drive motor which is connected to the drive end of the internal tank auger. A feeder hose having a flexible, internal auger detachably connects to the outlet end of the internal tank auger by a cam lock coupling provided on one end of the feeder hose and on the outlet end of the internal tank auger. An auger coupling extending from the cam lock coupling end of the feeder hose mateingly engages the internal tank auger when connected. A drybreak assembly connects the feeder hose with a planter hopper box for later dissemination.

29 Claims, 4 Drawing Sheets

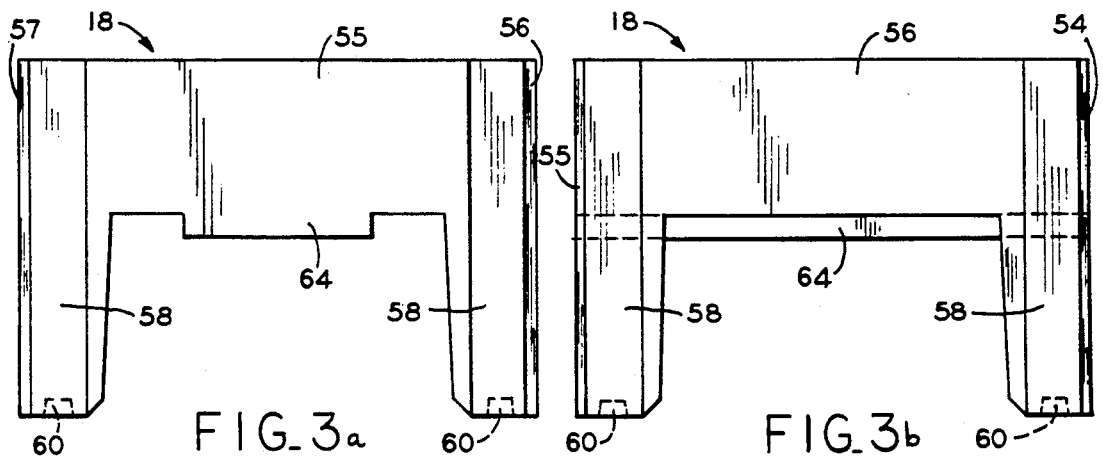
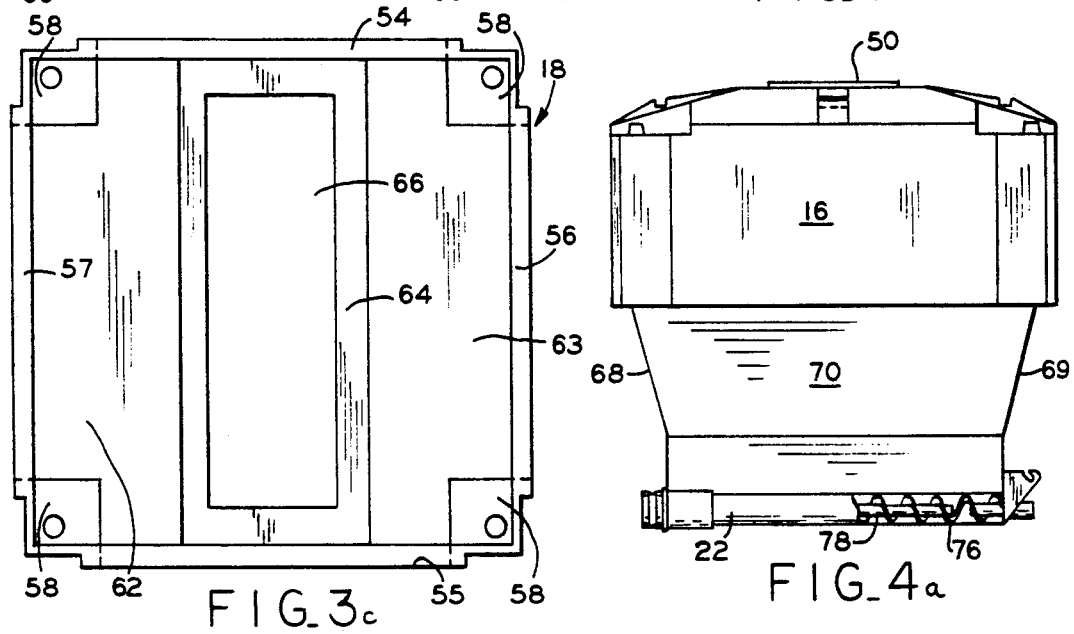
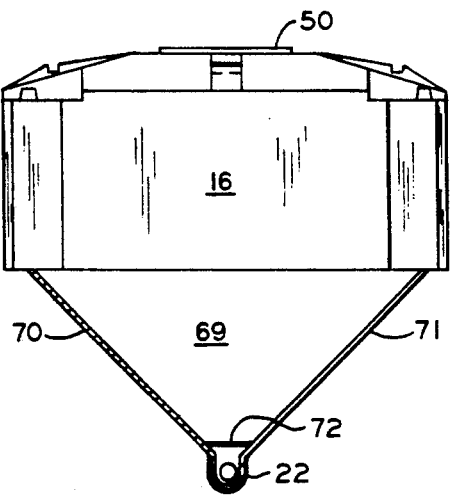
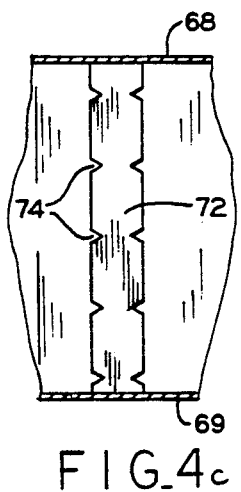

CHEMICAL HANDLING SYSTEM

CROSS-REFERENCE TO RELATED APPLICATIONS

This is a continuation-in-part of patent application Ser. No. 07/654,785 entitled "Chemical Handling System," filed Feb. 11, 1991, by D. Callahan, C. Reese, and D. Baxter now abandoned.

BACKGROUND OF THE INVENTION

The present invention relates to a system for handling agricultural chemicals and, more particularly, to a closed distribution system for agricultural chemicals that are supplied in dry form.

Today, chemicals are utilized by many growers to fend off or destroy pests, weeds, and diseases which ravage or inhibit the growth of the intended crop. These chemicals come in many different forms depending on the intended use or the grower's preference. In the agricultural community, dry form chemicals are widely utilized in conjunction with planters towed by tractors to spread the chemical onto the field.

Currently, dry form agricultural chemicals are supplied to the grower in 50 pound bags which must be carried to the distribution hopper, opened, and their contents dumped. As the chemical material such as pesticides, herbicides, or the like is dumped from the opened bags into the planter hopper, chemical dust and other contaminants are released into the air. These residues are breathed by the handler who pours the contents of the bag into the hoppers. In addition, the residues cling to the skin and clothing as well as to the machinery and surrounding structures. Very often, these chemicals are quite harsh or toxic and it is desirous that the grower be able to handle these chemicals without coming into contact with them, as they can be absorbed into the body through the skin. Further, it is desirous that such chemicals are not inhaled, as detrimental effects such as sickness, poisoning, or the like can occur.

SUMMARY OF THE INVENTION

The present invention is directed towards a dry form agricultural chemical distribution system having a refillable chemical storage tank with an integral, internal auger mechanism. A motor is detachably connected to a bracket mounted on the storage tank such that the motor drive shaft engages a drive coupling connected on one end of the integral internal tank auger, while a flexible auger delivery tube is detachably connected on the other end of the integral, internal tank auger by a camlock assembly. The auger delivery tube is further connected to a turn head assembly adapted to be detachably connected to a planter hopper.

The present invention, in one form thereof, solves the above problems by providing a closed chemical distribution system with refillable tanks, thereby eliminating the release of chemical dust and residue, by eliminating the opening of bags and the dumping of the contents. The desired chemical is purchased already contained in the sealed refillable storage tank which is then transported to the growing site. When the grower is ready to fill the planter hoppers, the motor is positioned on the tank's coupling bracket such that the motor drive shaft engages the drive coupling provided on one end of the internal tank auger. Wire leads connect the motor to the truck battery and remote switch located on the dry break mechanism. The flexible auger delivery tube is attached to the other side of the internal tank auger through a camlock coupling and auger shaft engagement. The turn head assembly, on one end of the delivery tube is then attached to the planter hopper. As the motor rotates the interconnected augers, the chemical flows by gravity down through a flow regulating mechanism and is delivered to the turn head assembly and into the hopper via the auger delivery tube. When the planter hopper is full the operator switches off the motor or, alternatively, a proximity switch located inside the dry break assembly automatically switches off the motor.

A chemical conveying system for conveying dry chemical to a chemical distribution apparatus is provided having a tank with an integral, internal auger disposed within the tank, a flexible auger tube conveying the chemical to a turn head assembly and connected to a distribution hopper.

An aspect of the present invention, in one form thereof, includes a chemical storage tank with a motor driven integral, internal tapered auger disposed at the bottom of the tank and an incrementally adjustable chemical flow regulating mechanism disposed radially above the internal auger, and a flexible auger tube connected to the internal auger conveying the chemical to a turn head assembly on a planter hopper.

An advantage of the tapered auger is the reduced amount of torque required to turn the internal auger when the hopper is full. This allows the motor to provide more R.P.M., which results in greater pounds per minute output.

The invention, in one form thereof, provides a dry form chemical distribution system including a refillable tank assembly having an integral, internal auger with an outlet end and a drive end, and an internal flow regulating mechanism feeding the chemical into the internal auger. A motor is adapted to be detachably connected to the drive end through a drive coupling for rotation of the auger mechanism. One half of a camlock fitting is disposed on the outlet end of the integral auger mechanism and is adapted to detachably connect with an internal auger delivery tube having the mating camlock fitting. The delivery tube communicates with a dry break or turn head assembly which includes a motor start/stop and proximity switch and is adapted to detachably connect with the lid of a hopper planter bin.

It is therefore an object of the present invention to provide a system for handling dry form agricultural chemicals which minimizes the handler's contact with the chemical, either through inhalation or skin absorption.

It is another object of the present invention to provide a closed dry form chemical distribution system that feeds the chemical into a hopper being switched from the remote hopper.

It is further an object of the present invention to provide a system for handling dry form agricultural chemicals that is easy to use, and reduces the hazards of handling the chemicals.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3a is a side elevational view of the tank base;

FIG. 3b is an elevational view of the tank base;

FIG. 3c is a plan view of the tank base;

FIG. 4a is an elevational view of the tank with a fragmentary view of the internal tank auger;

FIG. 4b is side elevational view of the tank;

FIG. 4c is a plan view of the baffle plate located in the tank;

Corresponding reference characters indicate corresponding parts throughout the several views. The exemplification set out herein illustrates a preferred embodiment of the invention, in one form, and such exemplification is not to be construed as limiting the scope of the invention in any manner.

DESCRIPTION OF THE PREFERRED EMBODIMENT

Figure 1:
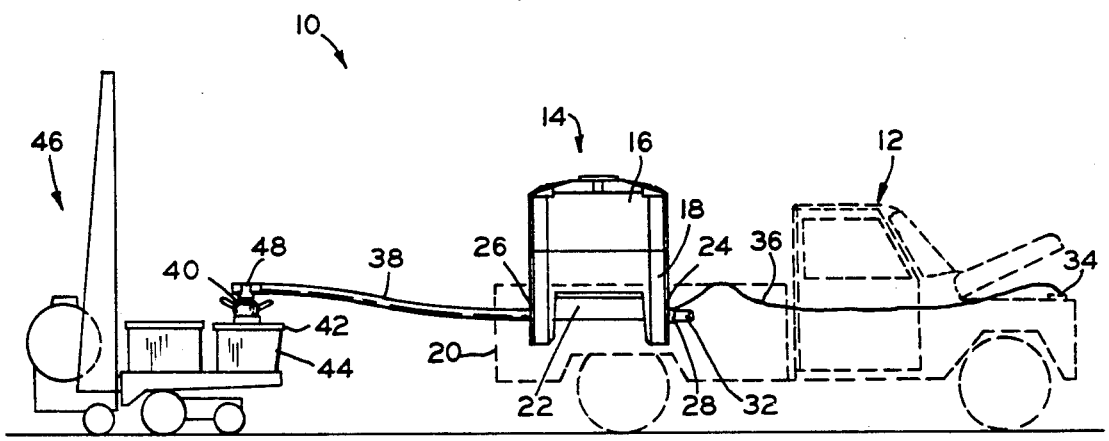
FIG. 1 is an elevational view of the dry form agricultural chemical handling system of the present invention.

Referring to FIG. 1, there is shown an embodiment of the dry form agricultural chemical distribution system 10 as it appears during operation. Depicted is a pickup truck 12 with a refillable tank assembly 14 comprising tank 16 and tank base 18 resting on truck bed 20. Tank and base assembly 14 are supplied by the chemical manufacturer. Located at the bottom of and internal to tank 16 which extends below tank base 18 is an integral, internal tank auger mechanism 22 having a drive end 24 and an outlet end 26. Connected on the drive end 24 of the internal tank auger 22 is a drive coupling 28 for engaging the drive shaft 30 (see FIG. 9) of a detachable electric motor 32 which is in communication with a battery power source 34 through wire lead 36. A standard commercially available flexible auger delivery tube 38 has one end detachably connected to the outlet end 26 of the internal tank auger 22 and the other end connected to a dry break assembly 40. Dry break assembly 40 is adapted to connect to the lid 42 of a planter hopper 44 which is shown mounted on an agricultural planter 46. Switch 48 is mounted on turn head assembly 40 and is operably connected to activate and deactivate motor 32 through a wire lead (not shown).

Figure 2:
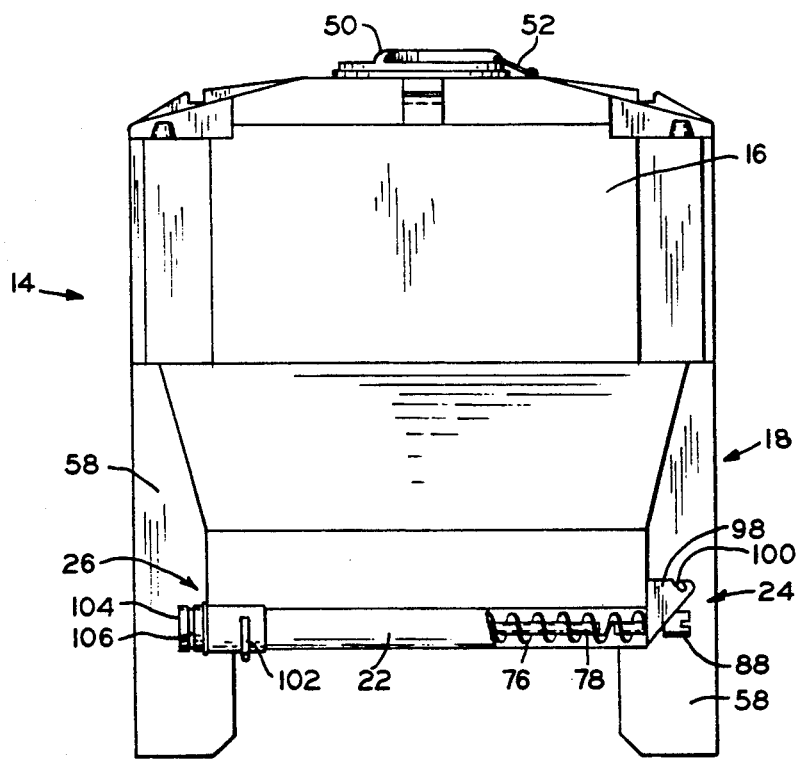
FIG. 2 is an elevational view of the chemical tank assembly with a portion broken away to show the internal tank auger.

The present invention will now be described in more detail. Referring to FIGS. 2–4, tank assembly 14, which can be obtained in a filled condition from the chemical manufacturer, includes tank portion 16 supported on tank base 18. As shown in FIGS. 3a, 3b, and 3c, tank base 18 is defined by two sets of essentially parallel side walls 54, 55, and 56, 57 integrally molded with legs 58 having stacking notches 60. Base 18 also includes downwardly converging walls 62, 63 joining with a flat rectangular portion 64 having an opening 66 through which extends the internal auger portion 22 of tank 16. Tank 16, as shown in FIGS. 4a and 4b, includes two sets of downwardly converging walls 68, 69, and 70, 71 which correspond with base side walls 54, 55, 56, and 57, and serve to downwardly direct the chemical material inside tank 16 towards auger assembly portion 22. A flow regulating mechanism such as a baffle or restrictor plate 72 is radially disposed above internal tank auger 22 and between tank 16 side walls 69 and 70 (see FIG. 4b). Baffle plate 72 (FIG. 4c) is a flat plate having restrictor notches 74, shown here as triangular in shape, and is present to prevent the full weight of the chemical material inside tank 16 from feeding into and clogging the auger assembly 22 by regulating the flow rate or amount of chemical material flowing into the internal tank auger 22.

Figure 10:
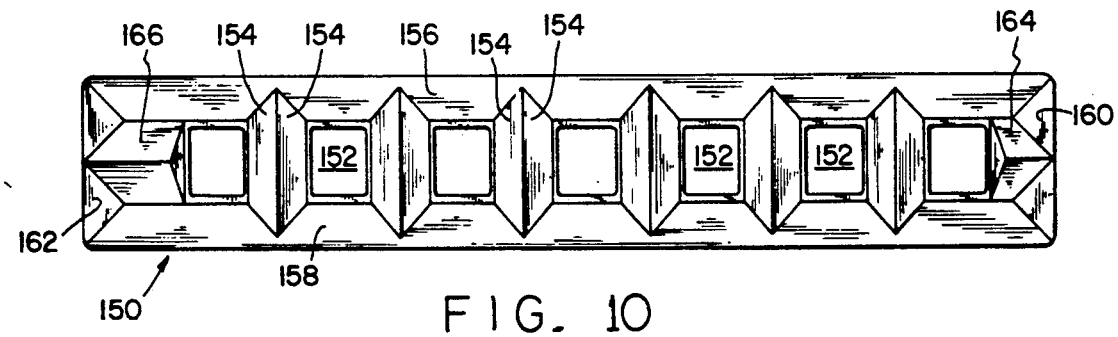
FIG. 10 is a plan view of the regulating plate located in the tank.
Figure 11:
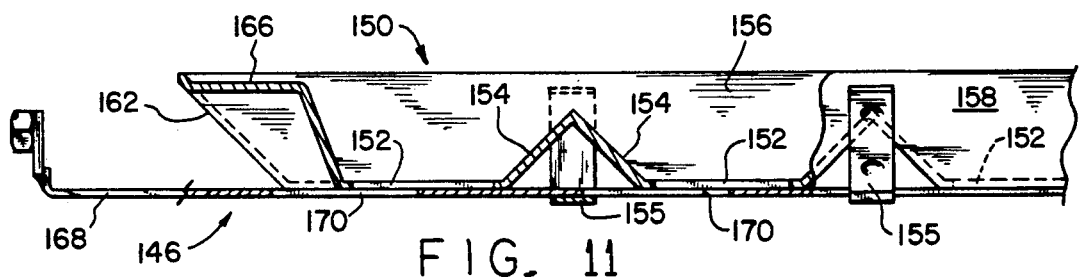
FIG. 11 is an enlarged fragmentary sectional view of the regulating assembly.
Figure 12:
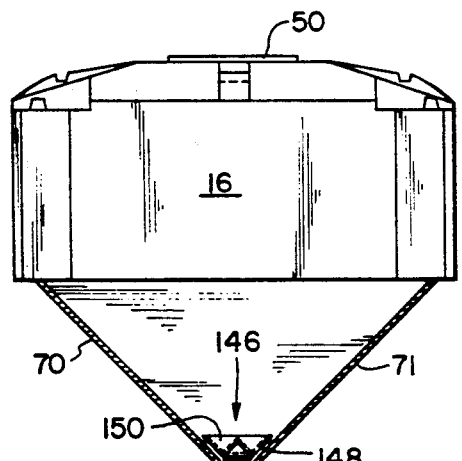
FIG. 12 is a side elevational view of the tank with the regulating assembly and mounting plate.

Referring to FIGS. 10-12, there is shown a sliding plate assembly 146 as an alternative embodiment of the flow regulating mechanism. As shown in FIG. 12, sliding plate assembly 146 is radially disposed over internal tank auger 22 and between tank 16 side walls 69 and 70. An assembly mounting clip 148 fixedly holds assembly 146 in place within tank 16. Sliding plate assembly 146 includes a plate 150 having a plurality of rectangular openings 152 that allow the chemical to flow therethrough into internal auger 22. Each opening 152 is separated from each other by an upwardly outwardly sloping wall 154 that join together to form triangular cross sections (see FIG. 11), while side walls 156 and 158 also upwardly slope away from openings 152. Thus, each opening 152 is bounded by upwardly outwardly sloping walls that funnel the chemical into openings 152. Plate 150 also includes on its longitudinal ends 160 and 162, sloping walls 164 and 166 to direct the chemical from the side into openings 154.

Disposed underneath plate 150, and likewise held by and above assembly mounting clip 148, is a slide plate 168 having openings 170 spaced along the longitudinal length that correspond in size to openings 152 in plate 150. Slide plate 168, as shown in FIG. 11 is supported by mounting brackets 155 attached to plate 150 such that slide plate 168 is slidable along the longitudinal length of plate 150 and internal auger 22. As slide plate 168 is manually moved, openings 170 are selectively offset with openings 152 in plate 150 such that an incremental-sized opening is defined ranging from closed to fully open as openings 170 and 152 coincide. If slide plate 168 is slid into a position such that no portion of openings 170 coincide with openings 152, i.e. a closed position, then no chemical would flow into internal auger 22 and flexible delivery tube 38. Closing slide plate 168 thus allows the emptying of delivery tube 38 since no more chemical enters from tank 16.

As slide plate 168 is slid towards a position such that openings 170 and 152 fully coincide, i.e. a fully open position, openings 170 and 152 will be incrementally coinciding, thereby defining a larger sized opening until the fully open position is achieved. Opposite movement of slide plate 168 will, of course, incrementally reduce the size of the opening until a closed position is achieved when no portion of openings 170 and 152 coincide. This flow regulation assembly allows the operator to regulate the flow of falling chemical to coincide with the auger rotation speed, as well as achieve a more uniform flow into the auger mechanism. In addition, by utilizing variable openings, the operator can gradually open slide plate 168 during motor/auger start up permitting the weight exerted by the chemical on auger 22 to be gradual, thus reducing start up torque on motor 32.

Tank 16 is refillable through tank lid 50, however, the tank refill process is done by the chemical purveyor and is not to be accomplished by the user. Seal strap 52 is attached to tank lid 50 and tank 16 to evidence that the tank has been refilled and not tampered with.

Figure 5:
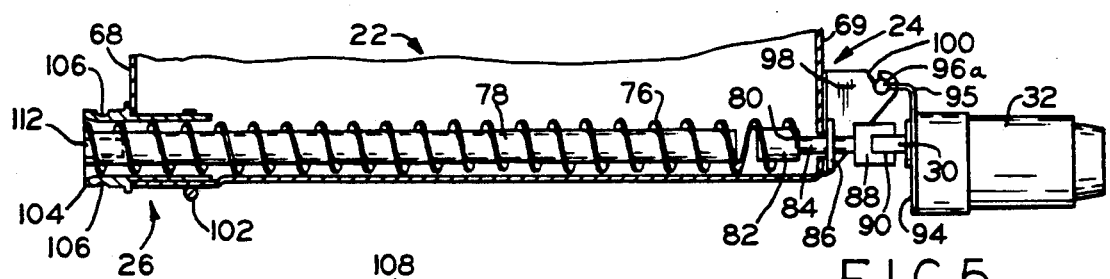
FIG. 5 is an enlarged sectional view of the internal tank auger assembly with cam assembly and driving motor attached.
Figures 8, 9:
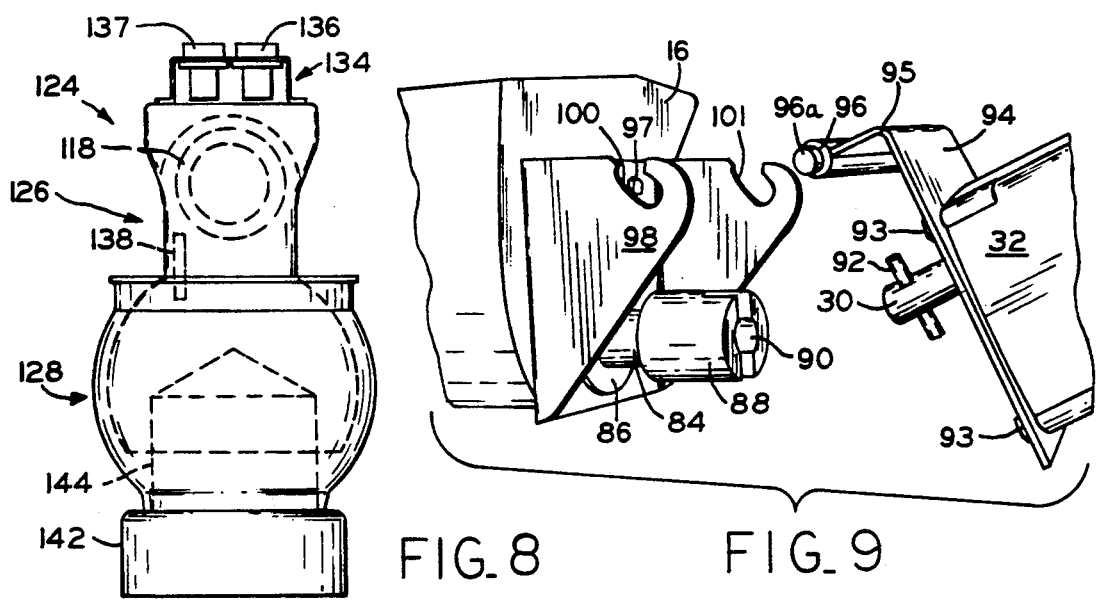
FIG. 8 is a side view of the turn head assembly.
FIG. 9 is an enlarged, exploded perspective view of the motor mounting assembly and drive coupling.

In accordance with one aspect of the present invention, and referring in particular to FIG. 5, the internal tank auger 22 includes a flex auger 76 radially disposed around auger tubing 78 and auger tubing extension 80. This type of flex auger is known for general applications and is commercially available. Flex auger 76 is fixedly welded to auger tubing extension 80 at weld joint 82. Auger tubing 78 is discontinuous within internal tank auger 22 to prevent "worming" but still provides horizontal support to flex auger 76 during auger rotation. Axially extending from auger tubing extension 80 is a coupling shaft 84 extending through wall 69 and supported by bearing plate assembly 86 terminating in drive coupling 88. As best shown in FIG. 9, drive coupling 88 has a recess 90 for engaging a roll pin 92 which radially extends from drive shaft 30. Fixedly attached to motor 32 by bolts 93 is a motor bracket 94 having a right angle bend 95 ending in a tubular extension 96. Mounted to tank 16 by bolts 97 is a coupling bracket 98 having two hooklike recesses 100 and 101 for engaging pin 96a in tubular extension 96.

Figure 13:
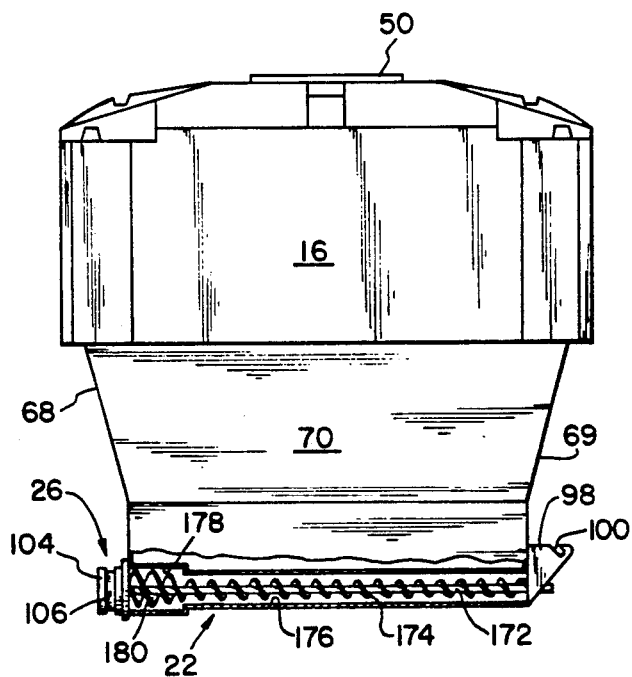
FIG. 13 is an elevational view of the tank with a sectional view showing an alternative embodiment of the internal tank auger.

Referring to FIG. 13, there is shown an alternative embodiment of internal auger mechanism 22 that balances out the incoming chemical flow from the flow regulating assembly. Internal tank auger 22 includes an auger tube 172 on which is radially disposed auger vanes 174 having a diameter from vane tip to vane tip that is one-half to three-quarters the size of the inner diameter of tank auger housing 176. Tank auger housing 176 has, adjacent tank outlet end 26, a larger diameter section 178 that accommodates a tapered section of auger vanes 180 that radially outwardly increase in diameter. The vane flight tapers from an outer diameter of about 1.5 inches to about 2.09 inches, although other dimensions may be utilized. The tapering increase in diameter of auger vanes 180 allows the conveyed chemical to enter delivery tube 38 with a decrease in pressure, thus allowing a smooth transition from tank 16 to tube 38.

In order to drive internal tank auger 22, motor 32 with bracket 94 is hooked on coupling bracket 98 by engaging pin 96a with recesses 100 and 101. Drive shaft 30 with roll pin 92 thus engages drive coupling recess 90 by a hinging action between tubular pin 96a and recesses 100 and 101.

Figure 6:
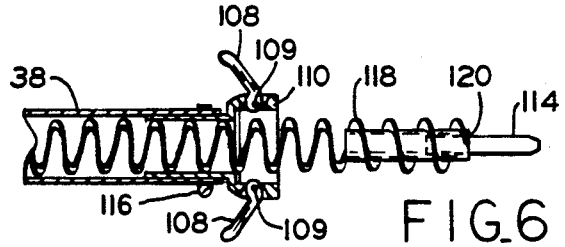
FIG. 6 is an enlarged fragmentary view of the auger feed tube and cam lever assembly.
Figure 7:
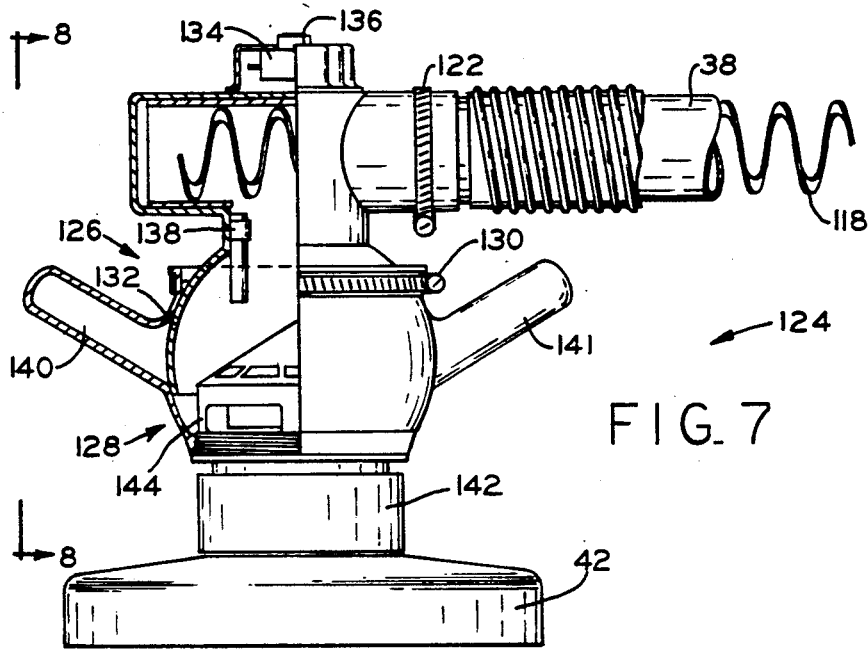
FIG. 7 is an elevational view, partially sectional of the turn head assembly.

Referring now to FIG. 5, connected on the outlet end 26 of the internal tank auger 22 by screw clamp 102, is a first camlock portion 104 having cam recesses 106 for engaging cams 108 of second camlock portion 110 (see FIG. 6). Auger tubing 78 includes hollow 112 into which auger coupling shaft 114 of delivery tube 38 fits in order to securely connect and drive auger delivery tube 38. Second camlock portion 110 is attached to delivery tube 38 by screw clamp 116. Delivery tube 38 includes an internal auger 118 welded to auger coupling shaft 114 at weld joint 120.

Connected on the other end of delivery tube 38 by screw clamp 122, is a turn head assembly 124 for interfacing with a planter hopper 44 through hopper lid 42. Turn head assembly 124 comprises an upper portion 126 and a lower portion 128, which are held together by screw clamp 130. Upper portion 126 is semi-ball shaped at its lower end 132 so as to form a ball joint between it and lower portion 128. This permits upper portion 126 to rotate independently, and with respect to, lower portion 128, and/or vice versa.

Auger 118 extends into upper portion 126 for delivering the chemical into the turn head assembly 124. Upper portion 126 includes a switch 134, having a start button 136 and stop button 137, which is in communication with motor 32 through a wire lead (not shown) for remotely starting and stopping motor 32 and consequently the feeding of chemical through the auger system to the turn head 124. A proximity switch 138 is mounted inside upper portion 126 to shut off motor 32 should hopper 44 fill up and the manual stop switch 137 not function because of either a malfunction or human error.

Lower portion 128 includes handles 140, 141 which allows the handler to fix turn head assembly 124 to lid 42 via a John Deere, Maxemerge ® planter lid adapter 142. Since the ball joint formed between upper and lower portions 126, 128 allows independent movement relative to each portion, upper portion 126, which is heavy due to delivery tube 38, can remain stationary while lower portion 128 is connected. Also incorporated into lower portion 128 is a known dry coupling assembly 144 such as that manufactured by American Cyanamid.

In order to further eliminate the dissipation of dust and residues into the air, lid 42 could be equipped with a filter device (not shown) which would trap the particles, dust and residues as they exit the planter due to the displacement of air caused by the filling of the hopper by the chemical.

The present invention is designed to easily and effectively move a dry form chemical from the refillable tank 16 to a hopper 44 for distribution onto the grower's field. The objects of the present invention are accomplished by providing a refillable tank assembly 14 having an internal, integral auger assembly 22 which is transported to the distribution site. The operator detachably connects the drive motor 3 with bracket 94 to the drive end 24 of the auger assembly 22 by placing the pins 96a of bracket 94 into hook-like recesses 100 and 101 of coupling bracket 98 which is fixedly attached to tank 16. Drive shaft 30 with roll pin 92 thus axially engages the drive coupling recess 90 of drive coupling 88, attached to the coupling shaft 84, as drive motor 32 with bracket 94 downwardly pivots into place. Wire lead 36 is connected to the power source while another lead is connected to switch 134 on turn head assembly 124.

Delivery tube 38 is detachably connected to the outlet end 26 of auger assembly 22 by a camlock assembly; the first camlock portion 104 of which is fixedly attached to the outlet end 26 of the auger assembly 22 while the second camlock portion 110 is fixedly attached to one end of the delivery tube 38. Second camlock portion 110 fits over first camlock portion 104 while cams 108 eccentrically rotate around cam pins 109 securely engaging respective cam recesses 106, thus preventing axial movement. During connection of delivery tube 38, auger coupling shaft 114, which is non-round in cross section, engages a correspondingly shaped hollow 112 within auger shaft 78 to drivingly connect the two and ensure that delivery tube internal auger rotates 118 when auger assembly 22 rotates. Turn head assembly 124, which is fixedly attached to the other end of delivery tube 38, is then detachably connected to the desired hopper lid 42 by turning arms 140, 141 to engage the threads. A butterfly valve (not shown) could be disposed at the discharge end of auger delivery tube 38 that would be manually controlled by the operator to shut off the flow of chemical into the planter hopper 44 regardless of the amount of chemical in the hopper 44. In addition, a limit switch (not shown) could be coupled to the butterfly valve that would automatically shut off the power to auger motor 32 when the butterfly valve is closed.

Start button 136 of switch 134 activates drive motor 32 which rotates internal auger 22 and delivery tube auger 118. Gravity and auger rotation downwardly directs the chemical inside tank 16 onto baffle plate 72 and through restrictor notches 74 into auger assembly 22. The chemical is fed through the auger mechanisms into the turn head assembly 124 which then fills the planter hopper 44. When the hopper 44 is filled to its desired level, stop button 137 is activated and the drive motor 32 ceases. A proximity switch 138, inside turn head assembly 124 and connected to switch 134, automatically stops drive motor 32 when the hopper is completely filled should the present invention be left unattended or the operator fail to manually depress stop button 137.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A chemical conveying system for conveying dry chemical to a chemical distribution apparatus comprising:
    a tank;
    an integral, internal auger mechanism disposed within said tank, said auger including a drive end and a separate, opposite outlet end;
    a motor detachably mounted to said tank, said motor including a drive shaft adapted to detachably drivingly engage said drive end of said internal auger mechanism; and
    a flexible auger delivery tube having a flexible auger therein, said flexible auger including on one end thereof engaging means for detachable rotational engagement with the said outlet end of said internal auger mechanism.

2. The conveying system of claim 1, further comprising a discharge assembly connected at the other end of said flexible auger delivery tube, said discharge assembly adapted to be connected to an inlet of the chemical distribution apparatus.

3. The conveying system of claim 1, wherein said tank is refillable.

4. The conveying system of claim 1, wherein a baffle is disposed within said tank in order to regulate the flow of chemical into said internal auger mechanism.

5. The conveying system of claim 1, wherein said internal auger mechanism includes on said drive end thereof a drive coupling adapted to detachably drivingly engage said drive shaft.

6. The conveying system of claim 1, further including coupling means for detachably connecting said one end of said flexible auger delivery tube to said outlet end of said internal auger mechanism.

7. The conveying system of claim 6, wherein said coupling means is a camlock coupling comprising:
    a first camlock portion connected to said outlet end of said internal auger mechanism, said first camlock portion including camlock recesses; and
    a second camlock portion connected to said one end of said flexible delivery tube, said second camlock portion including cam levers adapted to be received in said camlock recesses.

8. The conveying system of claim 1, wherein said discharge assembly comprises:
    an upper portion connected to the other end of said flexible delivery tube, said upper portion adapted to receive said flexible auger; and
    a lower portion adapted to rotatably receive said upper portion, said lower portion including distribution apparatus mounting means for detachably engaging said distribution apparatus.

9. The conveying system of claim 8, wherein said discharge assembly further comprises:
    switch means for selectively activating said motor.

10. The conveying system of claim 9, wherein said discharge assembly further includes a proximity switch for automatically stopping said motor when said discharge assembly fills with dry chemical.

11. A chemical distribution system comprising:
    a tank;
    an integral, internal auger mechanism disposed at the bottom of said tank, said auger including a drive end and an outlet end;
    a coupling bracket attached to said tank at said drive end;
    a drive coupling attached to said drive end of said auger;
    a motor including a drive shaft for rotating said internal auger mechanism, said drive shaft adapted for quick connecting engagement with said drive coupling by axial movement of said motor shaft relative to said drive coupling;
    a mounting bracket attached to said motor for quick disconnecting engagement with said coupling bracket;
    a flexible auger delivery tube having a flexible auger therein, said flexible auger including on one end thereof engaging means for rotational engagement with the other end of said internal auger mechanism; and
    coupling means for detachably connecting one end of said delivery tube to said outlet end; and
    a discharge assembly connected at the other end of said auger delivery tube, said discharge assembly adapted to be connected to an inlet of the chemical distribution apparatus.

12. The conveying system of claim 11, wherein said tank is refillable.

13. The conveying system of claim 11, wherein a baffle is disposed within said tank in order to regulate the flow of chemical into said internal auger mechanism.

14. The conveying system of claim 11, wherein said coupling means is a camlock coupling comprising:
a first camlock portion connected to said outlet end, said first camlock portion including camlock recesses; and
a second camlock portion connected to said one end of delivery tube, said second camlock portion including cam levers adapted to be received in said camlock recesses.

15. The conveying system of claim 11, wherein said discharge assembly comprises:
an upper portion connected to said delivery tube, said upper portion adapted to receive said flexible auger;
a lower portion adapted to rotatably receive said upper portion, said lower portion including distribution apparatus mounting means for detachably engaging said distribution apparatus, and a handle.

16. The conveying system of claim 15 wherein said discharge assembly further comprises:

17. A method for conveying a dry chemical to a chemical distribution apparatus, the method comprising the steps of:
providing a dry chemical tank which contains an integral, internal auger having a drive end and a separate outlet end for transporting the dry chemical from the tank;
providing a flexible conduit which contains a flexible internal auger for transporting the dry chemical from the internal tank auger, the flexible conduit attached to a discharge assembly to receive the dry chemical from the conduit;
attaching the flexible conduit to the outlet end of the integral, internal tank auger such that the flexible internal conduit aguer engages the internal tank auger;
attaching a deteachable motor to the drive end of the internal tank auger;
connecting leads from the motor to a vehicle mounted battery source;
attaching the discharge assembly to an inlet of the chemical distribution apparatus to receive the dry chemical; and
activating the motor to rotate the integral internal tank auger and flexible internal conduit aguer in order to feed the dry chemical from the tank to the chemical distribution apparatus.

18. The conveying system of claim 1 further comprising means for adjustably regulating the flow of chemical into said internal auger mechanism, said regulating means disposed within said tank.

19. The conveying system of claim 18, wherein said means for regulating comprises:
a first plate having a first plurality of spaced openings; and
a second plate slidably disposed radially below said first plate, said second plate having a second plurality of spaced openings, whereby said second openings incrementally coincide with said first openings.

20. The conveying system of claim 19, further comprising an assembly bracket for mounting said regulating means in said tank, said assembly bracket defining a surface on which said second plate is slidable.

21. The conveying system of claim 11, further comprising means for adjustably regulating the flow of chemical into said internal auger mechanism, said regulating means disposed within said tank.

22. The conveying system of claim 21, wherein said means for regulating comprises:
a first plate having a first plurality of spaced openings; and
a second plate slidably disposed radially below said first plate, said second plate having a second plurality of spaced openings, whereby said second openings incrementally coincide with said first openings ranging from fully non-coinciding to fully coinciding.

23. The conveying system of claim 22, further comprising an assembly bracket for mounting said regulating means in said tank, said assembly bracket defining a surface on which said second plate is slidable.

24. The conveying system of claim 1, wherein said internal auger mechanism radially outwardly tapers adjacent the outlet end of said internal auger mechanism.

25. The conveying system of claim 11, wherein said internal auger mechanism radially outwardly tapers adjacent said outlet end.

26. A chemical conveying system for conveying a dry chemical to a chemical distribution apparatus, the conveying system comprising:
a tank;
an integral, internal auger mechanism disposed within said tank, including a drive end and an outlet end, said auger being radially outwardly tapered adjacent said outlet end;
a motor detachably mounted to said tank, said motor including a drive shaft adapted to detachably drivingly engage the drive end of said internal auger mechanism;
a coupling bracket attached to said tank at said drive end;
a mounting bracket attached to said motor for quick disconnecting engagement with said coupling bracket;
a flexible auger delivery tube having a flexible auger therein, said flexible auger including on one end thereof engaging means for rotational engagement with the outlet end of said internal auger mechanism; and
a discharge assembly connected at the other end of said auger delivery tube, said discharge assembly adapted to be connected to an inlet of the chemical distribution apparatus.

27. The conveying system of claim 26, further comprising means for adjustably regulating the flow of chemical into said internal auger mechanism, said regulating means disposed within said tank.

28. The conveying system of claim 27, wherein said means for regulating comprises:
a first plate having a first plurality of spaced openings; and
a second plate slidably disposed radially below said first plate, said second plate having a second plurality of spaced openings, whereby said second openings incrementally coincide with said first openings.

29. The conveying system of claim 28, further comprising an assembly bracket for mounting said regulating means in said tank, said assembly bracket defining a surface on which said second plate is slidable.

* * * * *